(12) United States Patent
Kelgernon

(10) Patent No.: US 10,467,899 B2
(45) Date of Patent: Nov. 5, 2019

(54) FIRST RESPONDERS ANTICIPATION SYSTEM AND METHOD OF USE

(71) Applicant: Wyche Kelgernon, Jacksonville, FL (US)

(72) Inventor: Wyche Kelgernon, Jacksonville, FL (US)

(*) Notice: Subject to any disclaimer, the term of this patent is extended or adjusted under 35 U.S.C. 154(b) by 0 days.

(21) Appl. No.: 16/098,437

(22) PCT Filed: Aug. 7, 2018

(86) PCT No.: PCT/US2018/045675
§ 371 (c)(1),
(2) Date: Nov. 1, 2018

(87) PCT Pub. No.: WO2019/032621
PCT Pub. Date: Feb. 14, 2019

(65) Prior Publication Data
US 2019/0279506 A1    Sep. 12, 2019

Related U.S. Application Data

(60) Provisional application No. 62/541,806, filed on Aug. 7, 2017.

(51) Int. Cl.
*G08G 1/0965* (2006.01)
*H04W 4/90* (2018.01)
*G08G 1/16* (2006.01)

(52) U.S. Cl.
CPC ............ *G08G 1/0965* (2013.01); *G08G 1/16* (2013.01); *H04W 4/90* (2018.02)

(58) Field of Classification Search
CPC .......... G08G 1/0965; G08G 1/16; H04W 4/90
See application file for complete search history.

(56) References Cited

U.S. PATENT DOCUMENTS

| | | | |
|---|---|---|---|
| 2004/0143390 A1 | 7/2004 | King et al. | |
| 2008/0303660 A1* | 12/2008 | Lombardi | G08G 1/0965 340/540 |
| 2010/0207787 A1* | 8/2010 | Catten | G08G 1/096716 340/905 |
| 2011/0221611 A1 | 9/2011 | Lemmons et al. | |
| 2014/0166820 A1* | 6/2014 | Hilleary | B61L 29/246 246/125 |
| 2015/0116133 A1 | 4/2015 | Mawbey et al. | |
| 2016/0165424 A1* | 6/2016 | El-Dinary | H04W 4/90 455/404.2 |
| 2017/0019777 A1* | 1/2017 | Cole, Jr. | H04W 4/02 |
| 2018/0268690 A1* | 9/2018 | Gebers | G08G 1/0965 |

OTHER PUBLICATIONS

USPTO, International Search Report, in related application PCT/US18/45675, dated Oct. 15, 2018, 3 pages.
USPTO, Written Opinion of the International Search Authority, in related application PCT/US18/45675, dated Oct. 15, 2018, 4 pages.

* cited by examiner

*Primary Examiner* — Thomas S McCormack
(74) *Attorney, Agent, or Firm* — D'Hue Law LLC; Cedric A. D'Hue

(57) ABSTRACT

A system installed on a mobile phone for use in a vehicle that alerts the user when the vehicle is in proximity to emergency vehicles, trains, and fixed emergency locations.

17 Claims, 3 Drawing Sheets

FIRST RESPONDERS ANTICIPATION SYSTEM AND METHOD OF USE

CROSS-REFERENCE TO RELATED APPLICATIONS

This application is the national stage application of international PCT Patent Application number PCT/US18/45675, filed Aug. 7, 2018, which claimed benefit of U.S. provisional patent application, Ser. No. 62/541,806 filed on Aug. 7, 2017, the subject matter of each of the above referenced disclosures is expressly incorporated by reference herein.

FIELD

The field relates generally to warning systems for passenger vehicles and more specifically relates to warning systems that provide proximity alerts for emergency vehicles, trains, rail road crossings, and school crossings.

BACKGROUND

Everyone has been in a situation while driving and experiencing the sound of emergency vehicles and then looking around and not knowing their location until it is too late to move aside. Also, everyone has experienced a time when they do not hear the approach of emergency vehicles or trains. Rail road crossings and school crossings are potential accident sites where drivers need to exercise caution. These situations can be very unsafe and dangerous to drivers, passengers, first responders, and pedestrians.

Emergency vehicles such as fire trucks, ambulances, and police cars frequently must reach an emergency situation as quickly as possible. Other vehicles such as school buses transport vulnerable passengers. To facilitate their travel from one point to another location they use warnings systems such as flashing lights and sirens. Even with these warnings systems many motorists are still surprised to see one of these emergency vehicles approaching them from behind, from either the left or the right, or from in front of them. The surprise may be caused because they couldn't hear the sirens due to listening to audio devices while driving. They may also have obstacles to their line of sight so that they cannot see the flashing lights of the approaching emergency vehicle.

Emergency vehicles, such as police cars, ambulances and fire engines, when in an emergency state, travel at a high rate of speed and, usually, do so through crowded streets and roadways. Laws require that other motor vehicles immediately give the right-of-way to the emergency vehicle. The driver of the motor vehicle then must be aware of the approach of the emergency vehicle within a suitable time to safely allow this right-of-way. Motorists become aware of an approaching emergency vehicle in an emergency status via flashing lights, sirens, and horns.

Emergency vehicles need to travel quickly and safely through traffic in order to get to a destination. Conventional emergency vehicles use either sirens or emergency lights, or both, in order to get to the destination quickly and safely. It is often the case that a driver who is on the same road or a nearby road as the emergency vehicle is not made aware of the emergency vehicle's presence. This may be the case when the driver has poor hearing, is listening to the car radio, is on his or her car phone, etc. When this occurs, it may result in a dangerous situation when the emergency vehicle approaches the unaware driver, which may result in the driver causing an accident with the emergency vehicle or with another nearby vehicle on the road.

Also, when an emergency vehicle comes to an intersection, it is important that all vehicles approaching the intersection in different directions are made aware of the approaching emergency vehicle. Again, some drivers may not be aware of the sirens and emergency lights of the emergency vehicle, and this may result in an accident occurring with the emergency vehicle and/or other vehicles at or near the intersection.

A substantial number of motorists are involved in accidents each year because they were not aware of an approaching emergency vehicle which has the right-of-way in all situations. In 1998, according the National Safety Council, there were over 32,000 accidents involving ambulances, fire trucks, police cars, and other emergency vehicles. It's a big problem with modern cars, vans, SUV's, and trucks featuring sound-proofing, 8-speaker 100-watt factory installed stereo sound systems, high volume air conditioning fans, cell phones, and the like. It is desirable that public safety be enhanced, yet not intruding on our comfort level that we have come to expect with modern vehicles.

There are several hundred thousand railroad grade crossings exist at the intersection of railways and roads in the United States alone. It is important to provide reliable and accurate warning signals of approaching trains to prevent accidents. Many of these crossings are instrumented with the conventional "crossbuck" warning bell and light mounted pole which are very expensive to build and maintain. However, over 100,000 grade crossings have no warning system.

There is an increasing concern with the number of accidents at railroad crossings. Collisions with trains are generally catastrophic, in that the destructive forces of a train are usually no match for any other type of vehicle. Indeed, federal and state regulations require that many types of vehicles, termed "priority vehicles", take special precautions before crossing a "grade" railroad crossing. For example, school buses, hazardous cargo carriers and other emergency vehicles are often required to stop at railroad crossings and verify the absence of an oncoming train before proceeding. A "grade" railroad crossing is where a motor vehicle highway, street or road directly intersects a railroad track. An intersection of a highway and a train track that involves an overpass is not a "grade" crossing, as no collision would occur even if the vehicle and train arrived at the same location at the same time.

Thus, there is a need for a warning system in motor vehicles to alert drivers of approaching emergency vehicles, trains, rail road crossings, and school crossings. Many motorists simply do not hear horns or sirens as soon as they should which poses danger not only to themselves and passengers, but also to the emergency vehicles, trains, other passengers, and pedestrians.

There have been some solutions proposed to address this problem. One solution has been to use optical detectors at an intersection that detect light signals emitted from an approaching emergency vehicle, whereby the optical detectors would manipulate the traffic signal for oncoming traffic. One drawback to this solution is the lack of warning when an emergency vehicle is coming from behind a motor vehicle.

Another solution has been to use a radar detector, which would detect a signal transmitted from an emergency vehicle. One drawing to this solution is that false triggering of the radar may result in a driver turning off the radar detector out of frustration. Furthermore, the location and distance of the emergency vehicle would not be made available to the driver with this solution.

Yet another solution is to have the emergency vehicle transmit a radio frequency (RF) signal at a predetermined frequency or frequency range. In this case, each motor vehicle would be equipped with an RF receiver which would receive the RF signal output by the emergency vehicle when the emergency vehicle is traveling to its destination. A further enhancement to this solution would be to utilize global positioning satellites (GPS) in order to provide information as to the location of the emergency vehicle relative to the motor vehicle, whereby that information would be used by a microcontroller in order to determine the location of the emergency vehicle with respect to the driver's vehicle. The emergency vehicle's location would be displayed at the motor vehicle by way of one of four indicator lamps that are in the driver's view area (e.g., on the dashboard). Actuation of a first lamp would indicate that the emergency vehicle was somewhere ahead of the driver's vehicle, actuation of a second lamp would indicate that the emergency vehicle was somewhere to the left of the drivers vehicle, actuation of a third lamp would indicate that the emergency vehicle was somewhere to the right of the driver's vehicle, and actuation of a fourth lamp would indicate that the emergency vehicle was somewhere behind the driver's vehicle.

U.S. Pat. No. 6,339,382, issued to Donald Arbinger et al., discloses using both GPS signals, a RF transmitter, and a RF receiver. However, the '382 does not provide the driver with precise information as to the exact location of the emergency vehicle, and so the driver may not choose the best streets to travel through in order to evade the emergency vehicle and to evade the snarled traffic that typically occurs on streets that the emergency vehicle travels on.

The safety at railroad crossings has become of such significance that new federal agencies and studies have been undertaken to improve the grade crossing safety procedures. In view that a substantial number of fatalities occur every year due to collisions with trains, there has been an increased endeavor to provide sensors and detectors to warn oncoming traffic of the proximity of an approaching train. U.S. Pat. No. 5,739,768 describes a train proximity detector that provides a sensory indication to an operator when the vehicle and the train are located proximate each other. The train proximity detector of such patent receives the unique frequency transmitted by the train from the head end to the last car thereof. The carrier frequency transmitted by the train is decoded to identify certain data in the frame of transmitted data to thereby verify that the transmission originated from a train. While the train proximity detector functions very efficiently for its intended purpose, the operator of the vehicle will be given a warning of the proximity of the train, even if the train and vehicle are not on a collision course. For example, if the train and the car are traveling together, but in parallel paths, and there is no intersection between the road and the railroad track, the operator of the vehicle is nevertheless warned about the proximity of the train.

Other suggested devices attempt to overcome this problem, but at the expense of additional complexity, cost and apparatus that is required to be added to the equipment of the train. For example, in U.S. Pat. No. 4,942,395, by Ferrari, the train transmits on a first frequency to a receiver located at an intersection, and a second frequency is transmitted from a transmitter at the crossing to oncoming vehicles. In this manner, the vehicles do not directly receive the train transmission, and the vehicles are only provided a warning when in the proximate vicinity of the railroad crossing.

U.S. Pat. No. 5,554,928 by Shirkey et al. discloses a wireless train proximity alert system in which both a locomotive and vehicle rely on GPS coordinates for proper operation. In this system, the locomotive computes the train speed based on the GPS coordinates and transmits the coordinates and the train speed to a grade crossing transceiver. The grade crossing transceiver receives such information and computes an estimated time of arrival of the train. When the estimated time of arrival is within about 20-30 seconds of the grade crossing, the grade crossing transceiver transmits the coordinates of both the crossing and a boundary warning zone. A receiver mounted in a vehicle receives the coordinates of the grade crossing as well as the coordinates of the boundary warning zone around the grade crossing. In addition, the vehicle itself has a GPS receiver for receiving the coordinates of the vehicle. A controller determines if the vehicle is then within the boundary of the warning zone. If so, the controller determines if the vehicle is within a predetermined range of the crossing and if so, an alarm signal is provided. The predetermined range calculated by the vehicle controller is dependent upon vehicle speed and the braking distance of the vehicle which is a function of the type of vehicle.

Many other types of vehicle and train proximity detectors are proposed in the prior art. Many of the proposed techniques involve complicated and expensive equipment that must be added either to the train or to the vehicle, or both. It can be appreciated that in order for train proximity detectors to be installed on vehicles, in general, the equipment must be efficient, reliable and cost effective.

From the foregoing, it can be seen that a need exists for an improved train proximity detector that utilizes currently available resources to provide an operator of a vehicle with a sensory indication when the vehicle is in the vicinity of the train, and on a collision course therewith. Another need exists for an improved train proximity detector that relies on the presence of a train by conventional transmissions therefrom, as well as relies on GPS data for determining the location and direction of travel of the vehicle, whereby when such data is processed, it can be determined whether the vehicle is on a collision course with the train. A subsidiary need exists for a train proximity detector that has available data identifying each grade railroad crossing and corresponding compass bearing data of the roads crossing the railroad track.

Ideally, an automobile emergency vehicle warning display system should provide a motorist with visual and auditory warnings that an emergency vehicle is approaching and yet would operate reliably and be manufactured at a modest expense. Thus, a need exists for a reliable automobile emergency vehicle warning display system to avoid the above-mentioned problems.

SUMMARY

In one aspect of the invention, GPS is used to monitor the location of the user, emergency vehicles, trains, and fixed emergency locations, the locations of each are shown on the device, and the user is alerted when vehicles are located a minimum distance from the proximity of the user. The alert may increase in volume or frequency as the user's personal vehicle and source of the proximity alert get closer to each other.

In one embodiment, the present invention provides rapid identification of the relative location between the user's vehicle and the source of the proximity alert. The system can alert the user of the presence of an emergency vehicle, train, or fixed emergency location, even if the locations are still far apart but are headed on courses that are likely to intersect one another. A visual display is included to show the location of the user's vehicle and the source of the proximity alert. The invention can thus enhance safety for the drivers of both personal and emergency vehicles and trains.

In another embodiment, if the train and user's vehicle are moving parallel, the user is notified with audible and visual stimuli indicating the train & user location. The rail road option may be enabled, deactivated, or later reset. In one example, the railroad icon on/off switch is particularly suitable if the user lives or works near railroad activity.

In another embodiment, a count down of distance will appear and may be made audible as the source of the proximity alert approaches or detours within that alert radius.

In one embodiment, when count down is within 50 yds of collision course the audio warning intensifies & visual is highlighted with color.

In another embodiment, a count up distance will appear as the source of the proximity alert moves away from the user's location. The audio warning may change as the source of the proximity alert moves away from the user's location.

In another embodiment, the user's stereo volume will automatically lower when the proximity alert is initiated.

In an additional embodiment, when the route of the vehicle intersects the route of the user's personal vehicle, then the predetermined route of the source of the proximity alert is shown on the user's device.

In another embodiment the system app is installed on a user's device, which may be a monitor, phone, vehicle navigation, or display. The user's device may utilize Bluetooth wireless technology, radio frequencies, transmitters and signals, or satellites and a satellite software application to exchange data with the user's personal vehicle or the network and databases.

In additional aspects of the invention, rail road crossing alerts are incorporated.

In a further aspect of the invention, school crossing alerts are incorporated. The hours of operation for each school is stored in the maps and fixed location database. Representatives for the school may be given access to the database to change hours of operations accordingly.

In other aspects of the invention, each type of alert is unique.

In additional aspects of the invention, the user can select stimuli for each alert. The stimuli may be visual, auditory, a message, and any combination of the aforementioned.

In a further aspect of the invention, the system according to the invention is constantly in operation in a stand-by mode when the user's vehicle is in operation (e.g., when the key in the ignition is engaged), whereby there is no need for the user to activate the system according to the invention.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

Unless otherwise stated, a reference to a compound or component includes the compound or component by itself, as well as in combination with other compounds or components, such as mixtures of compounds.

As used herein, the singular forms "a", "an" and "the" include the plural reference unless the context clearly dictates otherwise.

All publications, patents and patent applications cited herein, whether supra or infra, are hereby incorporated by reference in their entirety to the same extent as if each individual publication, patent or patent application was specifically and individually indicated to be incorporated by reference.

Figure 1:
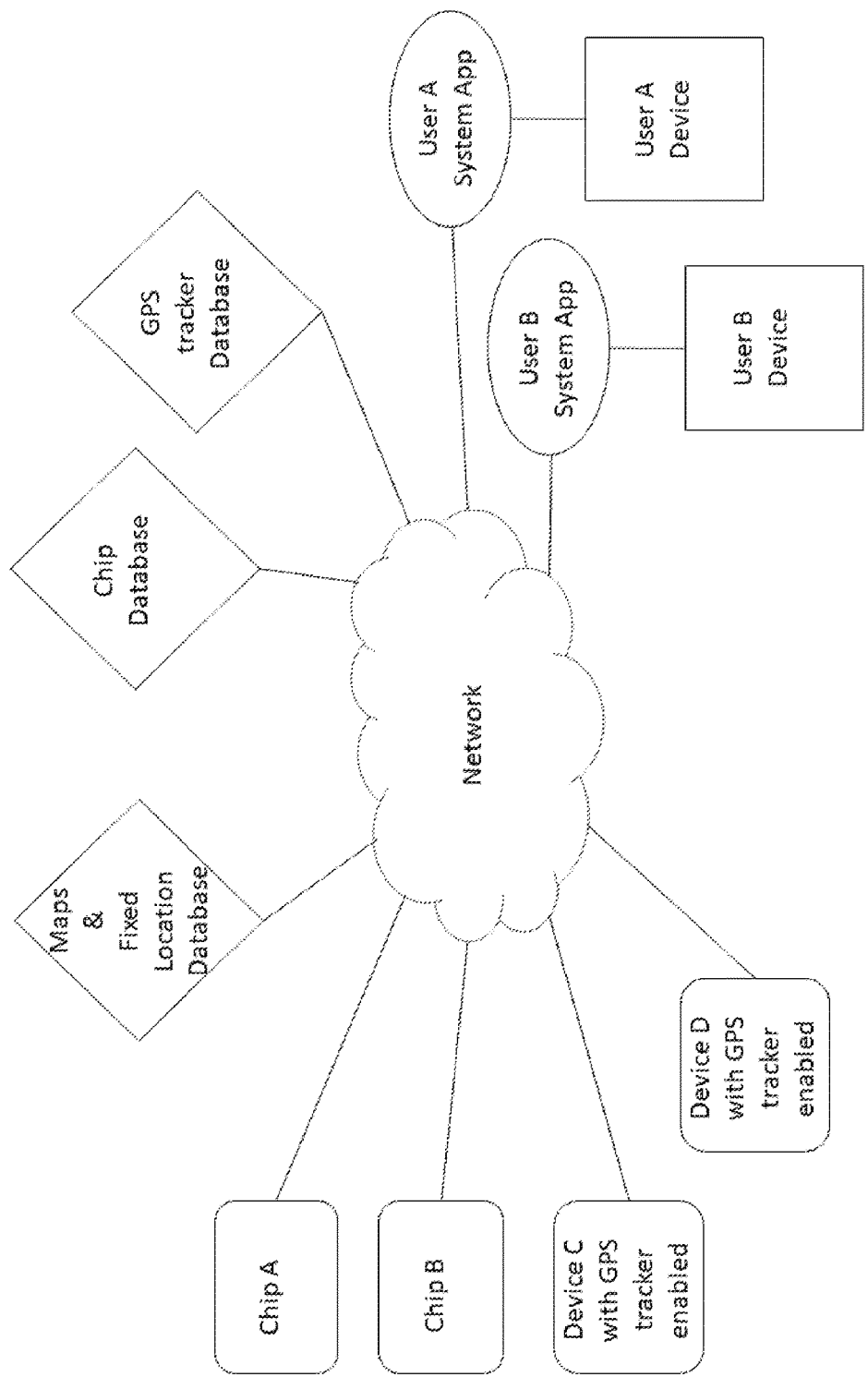

FIG. 1 illustrates the configuration of the components according to an embodiment of the present disclosure.

Figure 2:
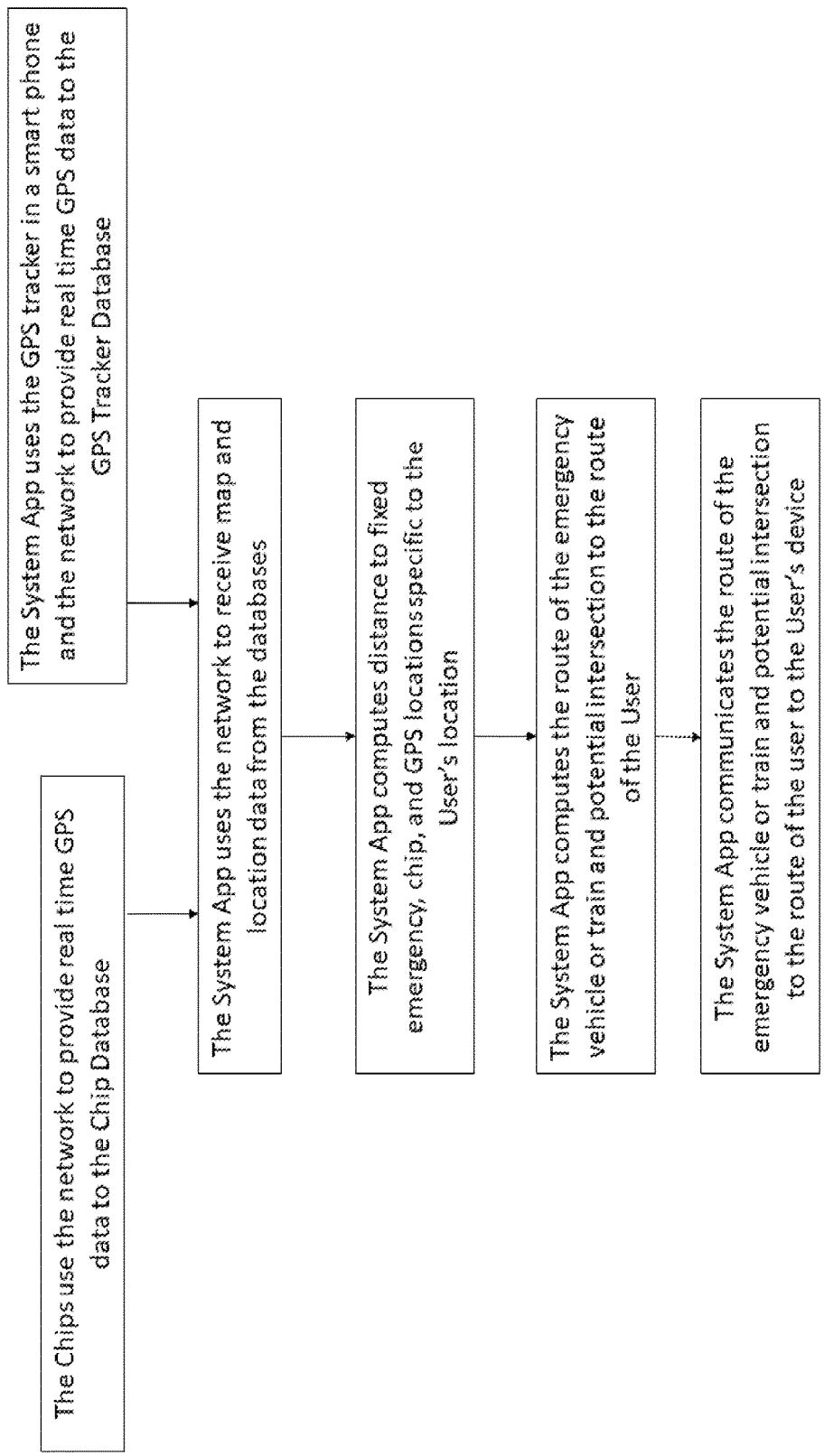

FIG. 2 illustrates how the present disclosure determines the real time location and route of an emergency vehicle relative to the location of the user.

Figure 3:
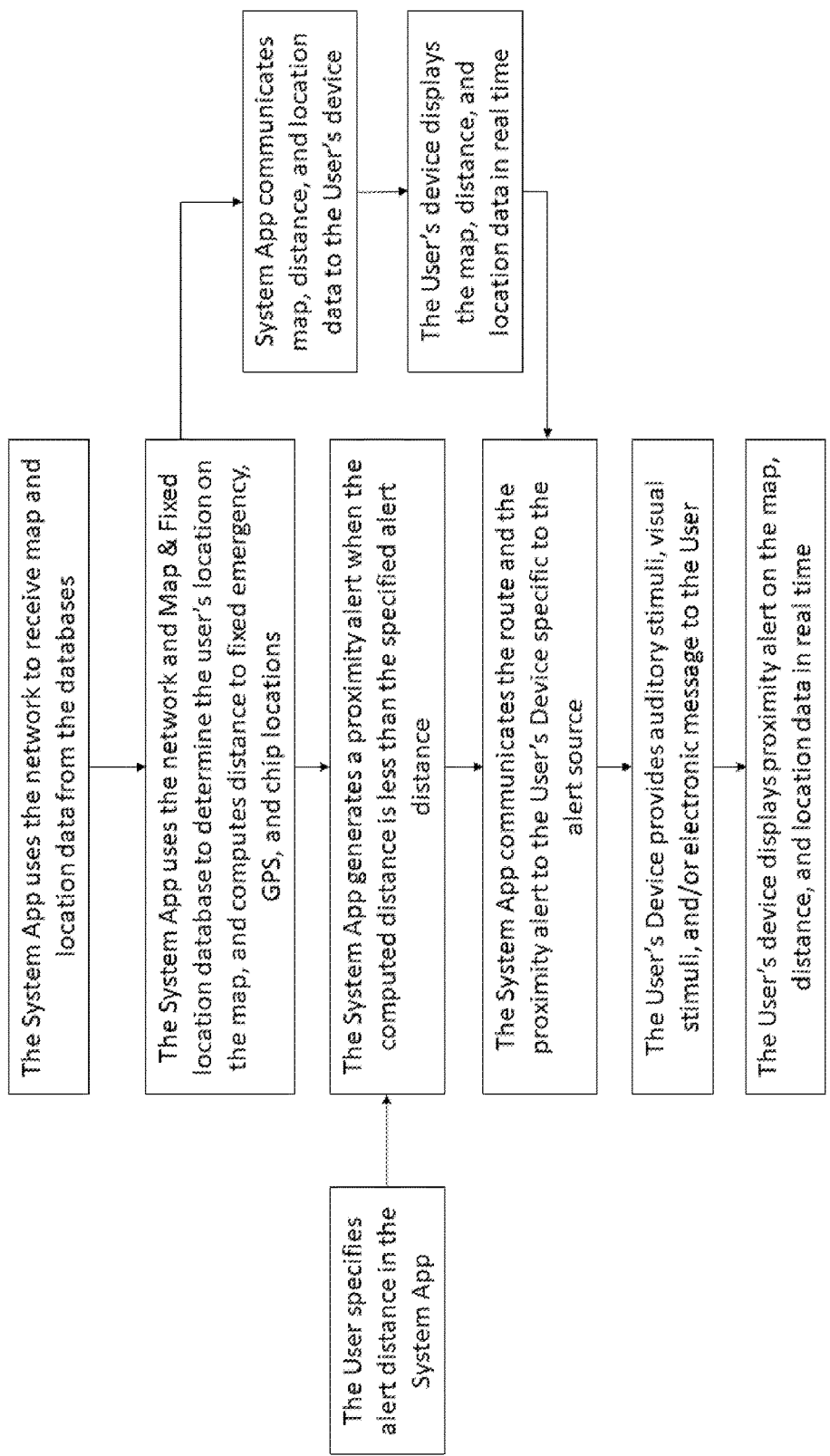

FIG. 3 illustrates how the present disclosure passes real time data and proximity alerts to the User's device.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

The system app is designed to provide proximity alerts and the GPS location of emergency vehicles, trains, and fixed emergency locations within a minimum alert distance.

In a first embodiment, when the user's location is within a minimum alert distance to the proximity of emergency vehicles, trains, or fixed emergency locations, the system will alert the user, and use GPS to display and show the locations of each on the user's device. The proximity alert may increase in volume or frequency as the personal vehicle and the source of the proximity alert get closer to each other.

In a second embodiment, a count down of distance appears and may be audible as the emergency vehicle or train approaches or detours within the proximity alert distance.

In a third embodiment, the stereo volume of the user's personal vehicle is automatically lowered when the proximity alert is sent to the user's device.

In a fourth embodiment, the predetermined route of the emergency vehicle or train is shown on the user's device when the route of the emergency vehicle or train intersects the route of the user's personal vehicle. These embodiments allow drivers of personal vehicles to safely move out of the path of emergency vehicles or trains in a timely manner.

In additional embodiments, fixed emergency locations, such as rail road crossings, school crossings, handicap crossings, vehicle breakdowns, train derailment, work zones, detours, road closures, and road maintenance locations, are also incorporated into the proximity alerts. In the case of fixed emergency locations, such as school zones or handicapped crossings or road maintenance locations, these will be shown on the map display using a different type of icon (e.g., post) and using a different color (e.g., blue). In any of these instances, when the emergency situation is passed (e.g., the emergency vehicle passes through the intersection in question from a different direction prior to the motorist's vehicle coming to that same intersection), the "red line" is removed from the map display even though the RF transmission from the emergency vehicle is still being received and the "delta shape" icon for the emergency vehicle is still being shown on the map display.

In one embodiment, fixed locations are stored in the maps and fixed location database. Representatives for the fixed locations may be given access to the database to enter and modify data pertinent to the fixed location.

In another embodiment, fixed locations are tagged with a chip. The option of using a chip may be particularly useful for transient fixed locations such as work zones, detours, road closures, and road maintenance locations. The chip may be activated or deactivated as needed by the representative for the fixed location.

In a fifth embodiment, rail road crossing alerts are incorporated. Rail road crossings are dangerous, the guard rail can malfunction, or there is no warning for an incoming train. In one embodiment, the rail road crossing alert is initiated whenever the front or rear of the train is within 200 yards.

In a sixth embodiment, school crossing alerts are incorporated. In one embodiment, the school crossing alert is initiated within 100 yards of the school crossing.

In additional embodiments, the proximity alert is initiated for distances ranging from 0 yards to 500 yards.

In further embodiments, the initiation distance for proximity alerts at rail road crossings is 500 yards, 400 yards, or 300 yards. The initiation distance for proximity alerts at school crossings or school buses is 150 yards, 100 yards, or 70 yards. The initiation distance for proximity alerts for emergency vehicles is 300 yards, 200 yards, or 150 yards.

In another embodiment, the user defines the distance for each proximity alert.

In another embodiment, the system application includes a means so that the user can choose to enable or disable each type of alert.

In further embodiments, the proximity alert may comprise a beep, a series of beeps, a tone, a combination of tones, a siren, train horn sound effects, a rail road crossing bell sound effect, ice cream truck sound effects, school bus sound effects, recorded effects, or other auditory alerts. The User may create their own auditory alerts that utilize recordings.

In other embodiments, the proximity alert may comprise a visual alert, such as a numeric count of distance, symbols, letters, words, colors and any combination thereof.

In additional embodiments, the proximity alert comprises both visual and auditory stimuli.

In another embodiment, the proximity alert is a message. The message may be an electronic message and it may be encrypted.

In another embodiment communications over the network are encrypted, such as those between the chips and the chip database, the devices with GPS tracker enabled and the GPS tracker database, and/or the user and the databases.

Examples of encryption well known in the art is 128 bit encryption, Advanced Encryption Standard (AES), Triple Data Encryption Standard (Triple DES), Twofish, RSA (named after Ron Rivest, Adi Shamir and Len Adelman), and Blowfish.

In one embodiment, the first responder's vehicle is equipped with a chip which is activated through the vehicle's lights and/or siren. The chip communicates the location of the vehicle to the chip database in real time.

In additional embodiments, the chip can be placed in any vehicle used for emergencies such as Fire trucks, Ambulance and Law Enforcement vehicles.

In additional embodiments, the chip is placed on additional vehicles. The chip may be placed on the front and rear of trains. The chip may be placed on school buses, preferably on the front. The chip may be placed on a hearse in a funeral procession. Other additional vehicles are also envisioned.

In another embodiment, while working, the first responders use a smart phone and system app that is registered in the GPS tracker database to track the location of the vehicle in real time.

In additional embodiments, the passenger of additional vehicles, such as trains, buses, or hearses, may use a smart phone and system app that is registered in the GPS tracker database to track the location of the vehicle in real time. GPS tracking of other additional vehicles is also envisioned.

In other embodiments, depending on the circumstances, the vehicle operator and/or passengers have the choice to activate or deactivate the chip or system app enabling a GPS tracker that passes location data to the databases.

Any chip in the state of the art is appropriate, especially those preferred by enginers, such as DRAM, Flash, EPROM and EEPROM.

As illustrated in FIG. 1, the components of the present disclosure comprise a multitude of chips, personal devices with a GPS tracker enabled, a network, a GPS tracker database, and maps and fixed location database, a chip database, and a system app installed onto an user's device.

In one embodiment, the personal device with a GPS tracker enabled is a smart phone, tablet, smart watch, or similar.

In further embodiments, the network comprises the internet, a private network, a government network, wi-fi, a smart phone network, a local area network, a wide area network, a wireless local area network, a storage area network, a system area network, a server area network, a campus area network, a cluster area network, and a personal area network.

As illustrated in FIG. 2, the present disclosure uses chips and GPS trackers to collect data for the real time location of a vehicle. The chip or GPS tracker uses a network to communicate the real time location of the vehicle to the chip database or the GPS tracker database. The system app uses the network to communicate to the databases and receive real time location data for vehicles. The system app installed on the user's device determines the relative location of each vehicle and the potential intersection of the user's route with the route of the vehicle.

In additional embodiments, the vehicle is an emergency vehicle, such as Fire trucks, Ambulance, Law Enforcement vehicles.

In additional embodiments the vehicle is additional types, including trains, and school buses.

As illustrated in FIG. 3, the system app passes real time data and proximity alerts to the User's device. The system app uses the network to access the maps and fixed locations database to determine the user's location and receive a map and location data. The system app communicates the map and location data to the user's device in real time. The system app uses the map and location data to compute distance to fixed emergency, GPS, and chip locations in real time. The system app determines proximity alerts when the computed distance is equal to or less than the alert distance in real time. The system app communicates the proximity alert to the user's device. The user's device generates a stimulus to notify the user of the proximity alert. The stimulus may be visual, auditory, and/or an electronic message.

In additional embodiments, the user specifies the alert distance for each type of alert.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A mobile device application for providing proximity alerts and the GPS location of emergency vehicles, trains, and fixed emergency locations within a minimum alert distance wherein said mobile device application:
   (a) tracks in real time the location of a user, the locations of emergency vehicles and trains, and the locations of fixed emergencies,
   (b) determines each distance between the user and locations of emergency vehicles, trains, and fixed emergencies,
   (c) generates a proximity alert for each distance that is equal to or less than the proximity alert distance,
   (d) computes the route of the emergency vehicle or train and determines if it will intersect the route of the user, and
   (e) transmits the locations, routes, and proximity alerts to the user's device,
   wherein the fixed emergency locations comprises rail road crossings, school crossings, handicap crossings, vehicle breakdowns, train derailments, work zones, detours, road closures, and road maintenance locations,
   wherein a countdown of distance between the source of the proximity alert and the user is provided by the mobile device application to the user's device,
   wherein the real time GPS location of emergency vehicles, and trains is transmitted by a chip or a GPS tracker over a network to databases and is stored as real time location data, and
   wherein the mobile device application uses a network to access the databases and the real time location data.

2. The mobile application of claim 1 wherein the proximity alert provides auditory stimuli, visual stimuli, and/or a message on the user's device.

3. The mobile application of claim 2 wherein the message is encrypted.

4. The mobile application of claim 1 wherein the proximity alert is audible as the source of the proximity alert approaches or detours within the proximity alert radius.

5. The mobile application of claim 1 wherein if the route of the emergency vehicle or train intersects the route of the user's personal vehicle, then the route of the emergency vehicle or train is also transmitted from the mobile device application to the user's device and displayed.

6. The mobile application of claim 1 wherein the user's device is a monitor or phone.

7. The mobile application of claim 1 wherein the user's device utilizes Bluetooth wireless technology to communicate with the user's personal vehicle.

8. The mobile application of claim 7 wherein the mobile device application automatically lowers the stereo volume of the user's personal vehicle when a proximity alert is initiated.

9. The mobile application of claim 1 wherein proximity alerts are initiated for distances ranging from 0 to 500 yards.

10. The mobile application of claim 1 wherein the user defines the distance for each proximity alert in the mobile phone application.

11. The mobile application of claim 1 wherein the chip or GPS tracker is activated when the vehicle's lights and/or siren is initiated.

12. The mobile application of claim 1 wherein the chip is placed on vehicles comprising fire trucks, ambulances, law enforcement vehicles, trains, school buses, and hearses.

13. The mobile application of claim 1 wherein the vehicle operator and/or passengers have the choice to activate or deactivate the chip or system application enabling a GPS tracker that passes location data to the databases.

14. The mobile application of claim 1 wherein the GPS tracker is on a smart phone.

15. The mobile application of claim 1 wherein the network comprises the internet, a private network, a government network, a smart phone network, a local area network, a wide area network, a wireless local area network, a storage area network, a system area network, a server area network, a campus area network, a cluster area network, and a personal area network.

16. The mobile application of claim 1 wherein the transmission of real time location data over the network is encrypted.

17. The mobile application of claim 1 further comprising an on/off switch so that the user can choose to enable or disable each type of proximity alert.

* * * * *